United States Patent
Kim et al.

(10) Patent No.: US 10,604,887 B2
(45) Date of Patent: Mar. 31, 2020

(54) CONTROL METHOD OF LAUNDRY TREATMENT APPARATUS

(71) Applicant: LG ELECTRONICS INC., Seoul (KR)

(72) Inventors: Yonghyun Kim, Seoul (KR); Seonil Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 15/861,814

(22) Filed: Jan. 4, 2018

(65) Prior Publication Data

US 2018/0195230 A1    Jul. 12, 2018

(30) Foreign Application Priority Data

Jan. 6, 2017  (KR) .......................... 10-2017-0002609

(51) Int. Cl.
*F26B 3/00* (2006.01)
*D06F 58/28* (2006.01)
(Continued)

(52) U.S. Cl.
CPC .............. *D06F 58/28* (2013.01); *D06F 25/00* (2013.01); *D06F 58/206* (2013.01);
(Continued)

(58) Field of Classification Search
CPC .......... D06F 58/02; D06F 58/04; D06F 58/08; D06F 58/24; D06F 58/28; D06F 58/206;
(Continued)

(56) References Cited

U.S. PATENT DOCUMENTS

2009/0025250 A1*  1/2009  Koo ................... D06F 58/28
                                                             34/491
2014/0041249 A1*  2/2014  Jung .................. D06F 58/206
                                                             34/282
(Continued)

FOREIGN PATENT DOCUMENTS

JP    2010-082112    4/2010
JP    2015-039597    3/2015
(Continued)

OTHER PUBLICATIONS

European Search Report dated Jun. 6, 2018 issued in Application No. 18150402.8.

*Primary Examiner* — John P McCormack
(74) *Attorney, Agent, or Firm* — KED & Associates LLP (57) ABSTRACT

A control method of a laundry treatment apparatus is disclosed which includes a course setting procedure receiving a control command including RPM control data of an impeller, RPM control data of a compressor or opening degree control data of an expansion valve, a hot air supply procedure for supplying heated air to a drum through control of the impeller, compressor and expansion valve, a temperature measurement procedure measuring temperature of air introduced into the drum during execution of the hot air supply procedure, a first control procedure for controlling the impeller, compressor and expansion valve based on the control command when the measured temperature is equal to or higher than a reference temperature, and a second control procedure controlling the impeller, compressor and expansion valve based on a control command different from the control command set in the course setting procedure when the measured temperature is lower than the reference temperature.

11 Claims, 3 Drawing Sheets

(51) Int. Cl.
*D06F 58/20* (2006.01)
*D06F 25/00* (2006.01)

(52) U.S. Cl.
CPC .......... *D06F 2058/287* (2013.01); *D06F 2058/2829* (2013.01); *D06F 2058/2838* (2013.01); *D06F 2058/2864* (2013.01); *D06F 2058/2896* (2013.01); *D06F 2202/04* (2013.01); *D06F 2202/065* (2013.01); *D06F 2204/04* (2013.01); *Y02B 40/72* (2013.01)

(58) Field of Classification Search
CPC ..... D06F 2058/2829; D06F 2058/2896; D06F 2058/2864; D06F 2058/2838; D06F 2058/287; D06F 2058/2858; D06F 2202/065; D06F 2202/04; D06F 2204/04; Y02B 40/72
USPC ......... 34/495, 491, 493, 497, 499, 507, 524, 34/526, 531
See application file for complete search history.

(56) References Cited

U.S. PATENT DOCUMENTS

| | | | | |
|---|---|---|---|---|
| 2014/0298676 | A1* | 10/2014 | Oak | D06F 58/08 |
| | | | | 34/499 |
| 2016/0040350 | A1* | 2/2016 | Xu | D06F 58/206 |
| | | | | 34/443 |
| 2016/0090683 | A1* | 3/2016 | Lyu | D06F 73/02 |
| | | | | 34/389 |
| 2016/0208428 | A1* | 7/2016 | Miranda Razo | D06F 58/28 |

FOREIGN PATENT DOCUMENTS

| | | | | |
|---|---|---|---|---|
| JP | 2015039597 A | * | 3/2015 | |
| WO | WO 2016/150660 | | 9/2016 | |
| WO | WO-2016150660 A1 | * | 9/2016 | ............. D06F 58/28 |

* cited by examiner

CONTROL METHOD OF LAUNDRY TREATMENT APPARATUS

CROSS-REFERENCE TO RELATED APPLICATION

This application claims the benefit of Korean Patent Application No. 10-2017-0002609, filed Jan. 6, 2017, which is hereby incorporated by reference as if fully set forth herein.

BACKGROUND

1. Field

The present invention relates to a control method of a laundry treatment apparatus.

2. Background

Generally, a laundry treatment apparatus is a generic term encompassing home electronic appliances capable of performing washing of laundry, drying of laundry, or both drying and washing of laundry. In a laundry treatment apparatus capable of performing drying of laundry, drying of laundry is achieved by supplying heated air (hot air) to a space receiving laundry. In connection therewith, there is a conventional laundry treatment apparatus using a heat pump.

Generally, a heat pump includes an evaporator configured to exchange heat with ambient air and, as such, to evaporate refrigerant present therein, a condenser configured to condense refrigerant present therein and, as such, to heat ambient air, and a compressor configured to compress refrigerant discharged from the evaporator and to supply the compressed refrigerant. In the laundry treatment apparatus using such a heat pump, however, the temperature of air introduced into the evaporator may become non-uniform depending on the environment wherein the laundry treatment apparatus is installed. For this reason, there is a problem in that the laundry treatment apparatus may not exhibit constant drying performance.

That is, when the laundry treatment apparatus operates under low-temperature conditions (when the laundry treatment apparatus is installed in a cold region or when the laundry treatment apparatus operates in winter), there may be a problem in that a long time is taken to raise the temperature of air supplied to laundry to a desired level through operation of the heat pump because the temperature of air introduced into the evaporator is low. This causes a problem of an increase in drying time and a difficulty in drying laundry to a desired level.

BRIEF DESCRIPTION OF THE DRAWINGS

Arrangements and embodiments may be described in detail with reference to the following drawings in which like reference numerals refer to like elements and wherein.

DETAILED DESCRIPTION

Reference will now be made in detail to the preferred embodiments of the present invention, examples of which are illustrated in the accompanying drawings. Meanwhile, the configuration or control method of an apparatus disclosed herein is illustrated only to explain embodiments of the present invention, and shall not be construed as limiting the scope of the present invention. In addition, the same reference numerals will be used throughout the specification to refer to the same parts.

Figure 1:
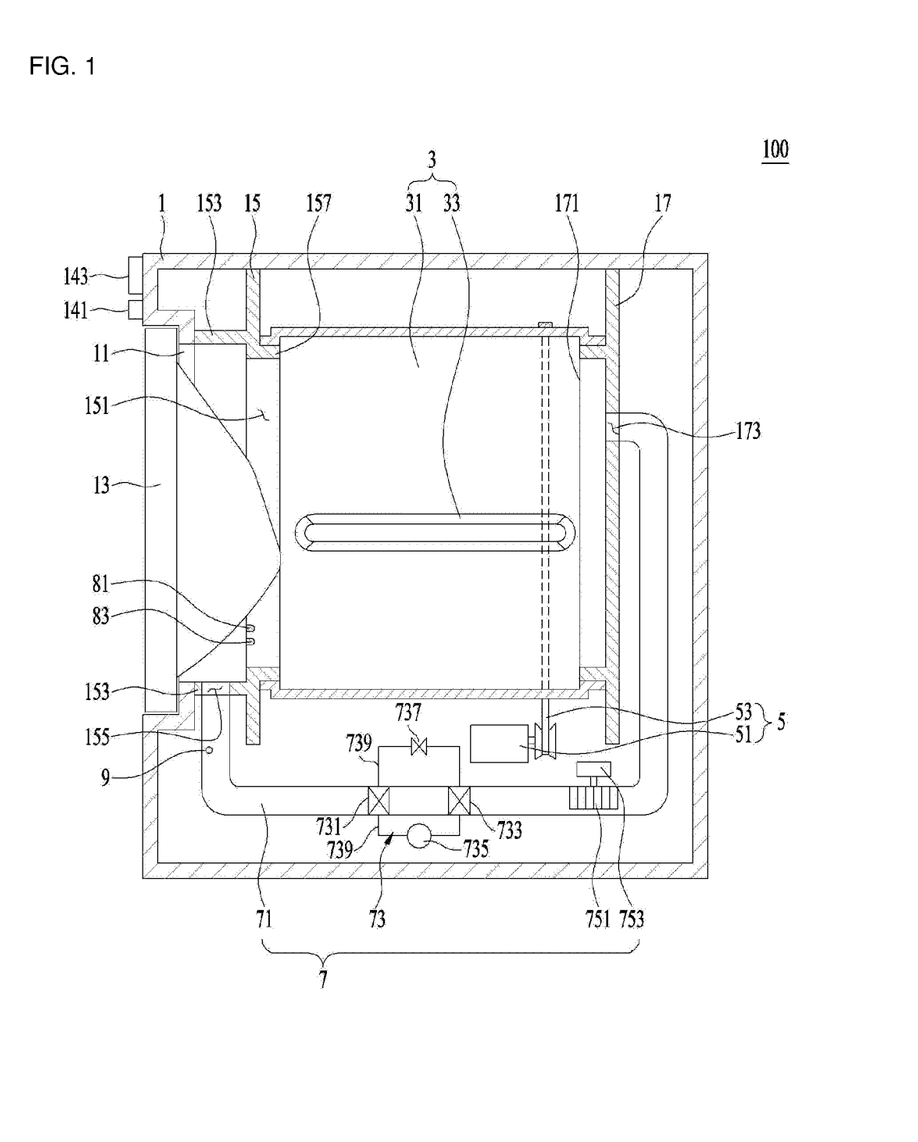
FIG. 1 is a view illustrating a laundry treatment apparatus according to an embodiment of the present invention.

FIG. 1 illustrates a laundry treatment apparatus according to an embodiment of the present invention. The laundry treatment apparatus, which is designated by reference numeral "100", may include a cabinet 1, a drum 3 installed in the cabinet 1 and configured to provide a space for storing laundry, a driving unit 5 configured to rotate the drum 3, and a hot air supplier 7 configured to supply non-heated air or heated air (hot air) to the drum 3.

The cabinet 1 is provided with a cabinet opening 11 configured to allow loading of laundry into the drum 3 or unloading of laundry from the drum 3. The cabinet opening 11 may be opened or closed by a door 13.

The cabinet 11 or the door 13 may be provided with a control panel configured to receive a control command from the user and to display an execution procedure based on the input control command. The control panel may include an input unit 141 configured to receive a control command from the user, and a display unit configured to display control commands selectable by the user or information as to an execution procedure based on a control command selected by the user.

The drum 3 may include a cylindrical drum body 31 having an open front surface and an open rear surface, and a lifter 33 (laundry tumbling means) protruding from a circumferential surface of the drum body 31 toward a rotation center of the drum body 31 at the inside of the drum body 31. In order to rotatably support the drum 3, a first support member 15 configured to support the front surface of the drum 3 and a second support member 17 configured to support the rear surface of the drum 3 may be provided within the cabinet 1.

That is, the first support member 15 includes a front support portion 157 fitted in an opening formed through the front surface of the drum body 31. The second support member 17 includes a rear support portion 171 fitted in an opening formed through the rear surface of the drum body 31 so as to rotatably support the drum body 31.

Meanwhile, the first support member 15 further includes an opening 151 configured to allow the cabinet opening 11 to communicate with the interior of the drum body 31. The opening 151 may be disposed in a space defined by the front support portion 157.

The first support member 15 is connected to the front surface of the cabinet 1 by a connecting portion 153. The connecting portion 153 may have a cylindrical shape surrounding the opening 151. In this case, the connecting portion 153 is provided with an outlet 155 configured to exhaust air discharged from the drum body 31 through the opening 151 to the outside of the connecting portion 153.

The driving unit 5 may be of any type, so long as the driving unit 5 can rotate the drum 3. FIG. 1 illustrates an example in which the driving unit 5 includes a motor 51 installed in the cabinet 1, and a belt 53 configured to connect a rotational shaft of the motor 51 to the circumferential surface of the drum body 31.

The hot air supplier 7 may include a duct 71 configured to form an air circulation path, a fan installed in the duct 71, and a heat pump 73 configured to dehumidify and heat air introduced into the duct 71.

The duct 71 is disposed at the outside of the drum 3, and configured to function as a flow path for again guiding air exhausted from the drum 3 to the drum 3. The duct 71 is connected, at one end thereof, to the outlet 155 provided at the first support member 15, and is connected, at the other end thereof, to an inlet 173 formed through the second support member 17.

The fan may include an impeller 751 rotatably installed in the duct 71, and a fan motor 753 installed at the outside of the duct 71 and configured to rotate the impeller 751.

The heat pump 73 may include a refrigerant tube 739 configured to form a refrigerant circulation path, an evaporator 731 disposed in the duct 71 and fixed to the refrigerant tube 739, a condenser 733 disposed in the duct 71 and fixed to the refrigerant tube 739, and a compressor 735 configured to compress refrigerant emerging from the evaporator 731 and to transfer the compressed refrigerant to the condenser 733. The heat pump 73 may further include an expansion valve 737 configured to open or close the refrigerant tube 739 (to adjust a flow rate of refrigerant) and, as such, to control the pressure of refrigerant emerging from the condenser 733.

The evaporator 731 absorbs heat from air introduced into the duct 71 and, as such, refrigerant passing through the evaporator 731 may evaporate within the refrigerant tube 739. The condenser 733 emits heat to air passing around the evaporator 731 and, as such, refrigerant passing through the condenser 733 may be condensed within the refrigerant tube 739. Thus, air passing around the evaporator 731 is cooled, whereas air passing around the condenser 733 is heated.

The compressor 735 may be of any type, so long as the compressor 735 can achieve the above-described function. For example, the compressor 735 may be a reciprocating compressor, a rotary compressor, a scroll compressor or the like.

Figure 2:
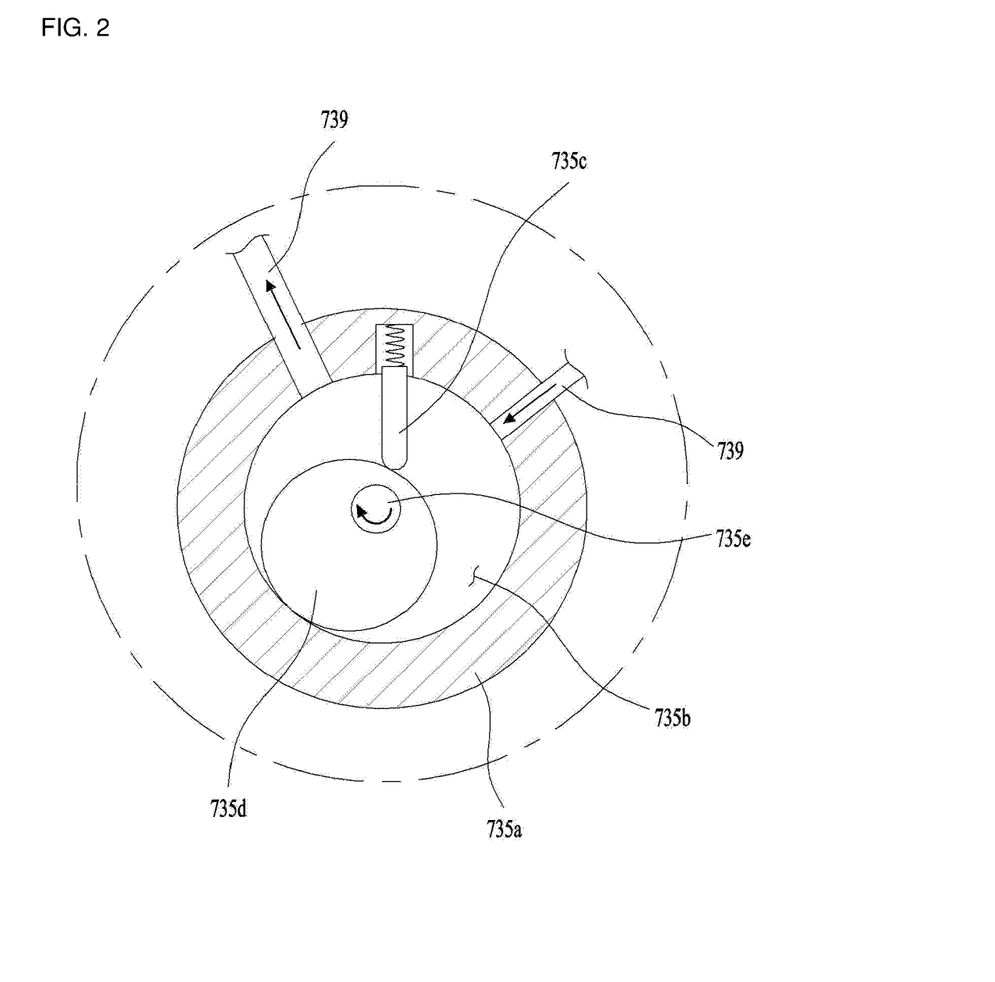
FIG. 2 is a view illustrating a compressor included in the laundry treatment apparatus.

FIG. 2 illustrates an example of the rotary compressor. The compressor 735 illustrated in FIG. 2 may include a housing 735a defined therein with a chamber 735b, a pressing member 735d rotatably disposed in the chamber 735b, a compressor motor configured to rotate the pressing member 735d, and a partition 735c disposed to contact the pressing member 735d and configured to divide the chamber 735b into two spaces.

The housing 735a includes a chamber inlet connected to the refrigerant tube 739 and configured to guide refrigerant discharged from the evaporator 731 to the chamber 735b, and a chamber outlet connected to the refrigerant tube 739 and configured to guide compressed refrigerant to the outside of the chamber 735b.

The pressing member 735d is configured to eccentrically rotate in the chamber 735b.

In the compressor 735 having the above-described configuration, refrigerant discharged from the evaporator 731 is introduced into one of the two spaces defined in the chamber 735b by the partition 735c.

When the pressing member 735d is rotated by a rotational shaft 735e in the above-described state, the introduced refrigerant is moved toward the partition 735c by the pressing member 735d. During this procedure, the refrigerant is compressed between the partition 735c and the pressing member 735d. The compressed refrigerant is then supplied to the condenser 733 via the chamber outlet and the refrigerant tube 739.

In the compressor 735 having the above-described configuration, control of compressor RPM means control of RPM of the compressor motor (RPM of the rotational shaft or RPM of the pressing member). When RPM of the compressor increases, RPM of the pressing member 735d increases and, as such, the flow velocity of refrigerant flowing through the refrigerant tube 739 increases. The compressor 735, the evaporation valve 737, the fan motor 753 and the driving unit 5 may be controlled by a controller (not shown).

The above-described embodiment is associated with the case in which the laundry treatment apparatus 100 is configured as an apparatus for drying laundry. However, the laundry treatment apparatus 100 may also be configured as an apparatus capable of performing both washing and drying of laundry.

When the laundry treatment apparatus 100 is configured as an apparatus capable of performing both washing and drying of laundry, the first support member 15 and the second support member 17 may be omitted. In this case, a tub configured to provide a space for storing water should be disposed within the cabinet 1.

The tub may be of any type, so long as the tub can provide a space for storing water. For example, a hollow cylindrical tub may be used. In this case, the drum 3 should have a cylindrical shape rotatable within the tub, and the duct 71 should be configured to circulate air present in the tub.

In addition, a tub opening configured to communicate with the cabinet opening 11 should be provided at a front surface of the tub. A drum opening configured to communicate with the tub opening should be provided at the front surface of the drum 3.

Meanwhile, as illustrated in FIG. 1, the laundry treatment apparatus 100 according to the embodiment of the present invention may further include a dryness sensing unit 8 configured to measure the dryness of laundry stored in the drum body 31.

The dryness sensing unit 8 may be of any type, so long as the dryness sensing unit 8 can measure the amount of water contained in laundry or the moisture content of laundry (the mass ratio of water to laundry). FIG. 1 illustrates an example in which the dryness sensing unit 8 includes a first terminal 81 fixed to the first support member 15, and a second terminal 83 fixed to the first support member 15 and spaced apart from the first terminal 81.

The first terminal 81 may be connected to an anode of a power supply, and the second terminal 82 may be connected to a cathode of the power supply. When a large amount of water is contained in laundry stored in the drum body 31, resistance generated by the laundry is relatively low. In this case, accordingly, a large amount of current may flow.

When wet laundry is maintained in contact with the terminals 81 and 83, current flows between the terminals 81 and 82. When a controller is provided to compare the amount of current flowing between the terminals 81 and 82 (or the value of a voltage enabling flow of current) with amounts of current (voltage values) according to experimentally measured dryness, the dryness of laundry may be determined in accordance with the embodiment of the present invention.

In addition, the laundry treatment apparatus 100 according to the embodiment of the present invention may further include a temperature sensing unit 9 configured to measure the temperature of laundry. The temperature sensing unit 9 may include a temperature sensor configured to directly measure the temperature of laundry. Alternatively, the temperature sensing unit 9 may include a temperature sensor configured to measure the temperature of air exhausted from the drum body 31 and, as such, to indirectly measure the temperature of laundry. FIG. 1 illustrates an example in which the temperature sensing unit 9 is provided at the supply duct 71 and configured to measure the temperature of air exhausted from the drum body 31.

Figure 3:
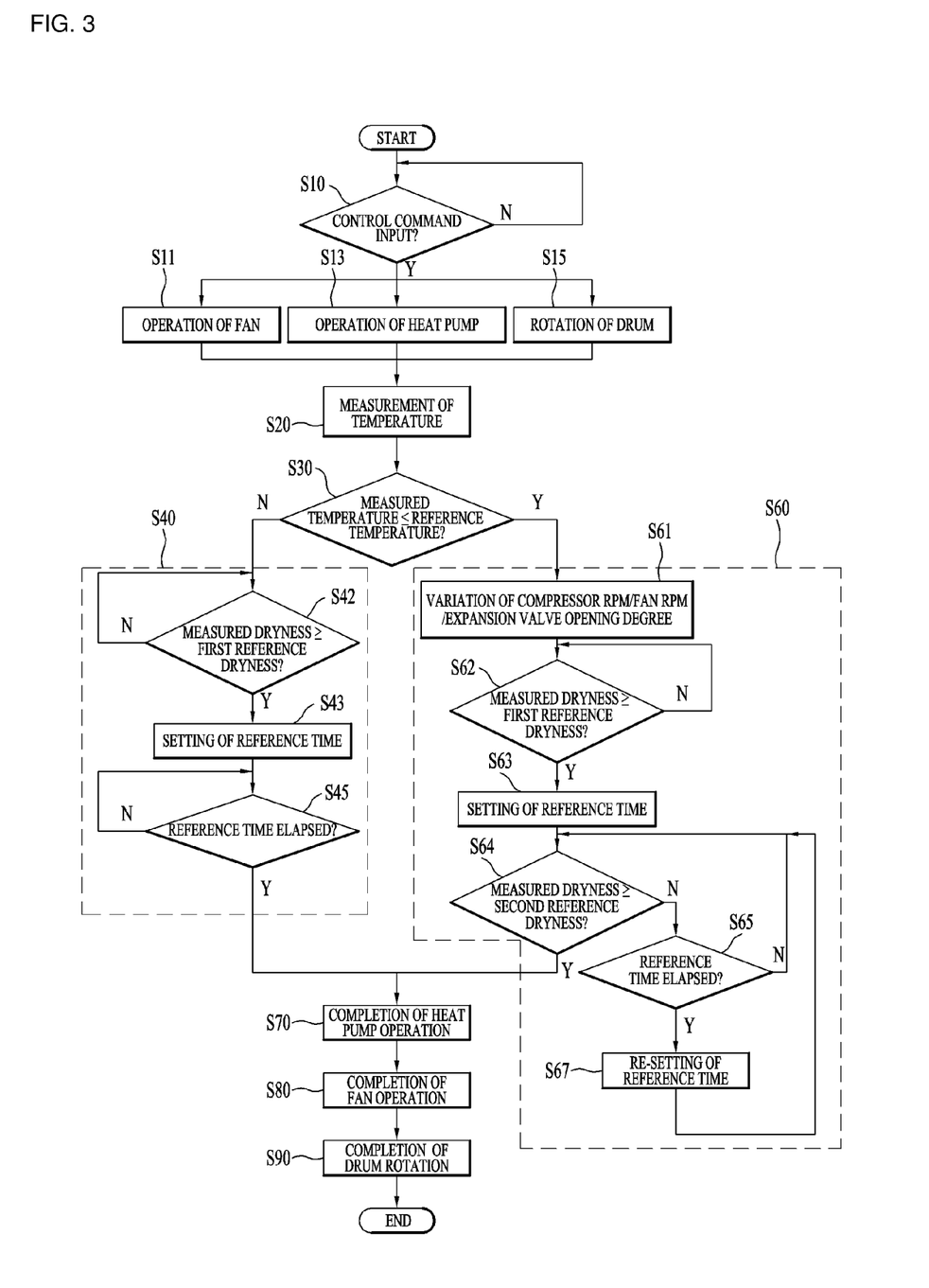
FIG. 3 is a flowchart illustrating a control method of the laundry treatment apparatus according to an embodiment of the present invention.

FIG. 3 illustrates an example of a control method of the laundry treatment apparatus 100 having the above-described configuration.

In accordance with an embodiment of the present invention, the control method includes a course setting procedure 10, and a hot air supply procedure including operations S11, S13 and S15 for supplying heated air to the drum 3.

The course setting procedure S10 is a procedure for selecting one drying course from a plurality of drying courses executable by the laundry treatment apparatus through the input unit 141 by the user. Each drying course means a control command or a set of control commands including data (control data) needed for control of the compressor, expansion valve and fan in association with drying of laundry. Accordingly, the control command input in the course setting procedure for selection of one drying course means control data including at least one of data for RPM control of the impeller 751, data for RPM control of the compressor 735 or data for opening degree control of the expansion valve 737.

In the course setting procedure 510, the controller (not shown) determines whether or not a control command is input through the input unit 141. When a control command is input through the input unit 141, the controller starts the hot air supply procedure.

The hot air supply procedure includes an operation 511 for operating the fan, and an operation S13 for operating the heat pump 73. The operation 511 for operating the fan is an operation of the controller operating the fan motor 753 and, as such, to rotate the impeller 751. The operation S13 for operating the heat pump is an operation of the controller controlling the compressor 735 and the expansion valve 737 such that air present in the duct 71 exchanges heat with refrigerant through the evaporator and the condenser.

In order to achieve easy heat exchange between hot air supplied to the drum via the duct 71 and laundry, the hot air supply procedure may further include a drum rotating operation S15 of the controller controlling the driving unit 5 such that the drum body 31 rotates.

In accordance with the illustrated embodiment of the present invention, during execution of the hot air supply procedure, a temperature measurement procedure S20 is executed to measure the temperature of air exhausted from the drum by the temperature sensing unit 9. When the temperature measured in the temperature measurement procedure S20 is equal to or higher than a predetermined reference temperature, the control method according to the embodiment of the present invention proceeds to a first control procedure S40 for controlling the impeller 751, the compressor 735 and the expansion valve 737 in accordance with a control command set in the course setting procedure S10 (data for RPM control of the impeller 751, data for RPM control of the compressor 735 or data for opening degree control of the expansion valve 737).

On the other hand, when the temperature measured in the temperature measurement procedure S20 is lower than the predetermined reference temperature, the control method according to the embodiment of the present invention proceeds to a second control procedure S60 for controlling the impeller 751, the compressor 735 and the expansion valve 737 in accordance with a control command different from the control command set in the course setting procedure S10.

The first control procedure S40 includes a dryness measurement operation for measuring the dryness of laundry by the dryness sensing unit 8, an operation S42 for determining whether or not the measured dryness is equal to or higher than a predetermined first reference dryness, and an operation S43 for setting a reference time increasing in proportion to the amount of laundry when the measured dryness is equal to or higher than the first reference dryness.

The operation S42 for determining whether or not the measured dryness is equal to or higher than the first reference dryness may be set to an operation for determining the measured dryness to reach a predetermined reference dryness when the value of current output when the two electrodes 81 and 83 are connected by laundry is equal to or lower than a predetermined reference value.

Alternatively, the operation S42 for determining whether or not the measured dryness is equal to or higher than the first reference dryness may be set to an operation for determining the measured dryness to reach a predetermined reference dryness when the value of a voltage enabling flow of current when the two electrodes 81 and 83 are connected by laundry is equal to or higher than a predetermined reference value.

The operation S43 for setting the reference time is an operation for determining a time when operation of the heat pump 73 is completed. As the heat pump continuously operates for the reference time set in the reference time setting operation S43 even when the measured dryness is equal to or higher than the first reference dryness, it may be possible to prevent operation of the laundry treatment apparatus from being completed due to errors of the dryness sensing unit 8 or other problems before the dryness of laundry reaches a target dryness set in association with a course selected by the user.

The reference time may be set to increase in proportion to the amount of laundry. In the control method according to the embodiment of the present invention, the amount of laundry may be estimated based on the time taken until the dryness of laundry reaches the first reference dryness. Generally, given an increased amount of laundry, the time taken until the dryness of laundry reaches the first reference dryness increases. In this regard, when the controller sets, in the reference time setting operation S43, the reference time to increase in proportion to the time taken until the dryness of laundry reaches the first reference dryness, it may be possible to set the reference time to increase in proportion to the amount of laundry.

When the reference time set in the reference time setting operation S43 elapses (S45), the control method according to the embodiment of the present invention proceeds to a procedure S70 for completing operation of the heat pump. The procedure S70 for completing operation of the heat pump may include an operation for completing operation of the compressor 735. Alternatively, the procedure S70 may include an operation for stopping operation of the compressor, and an operation for varying the opening degree of the expansion valve to a reference opening degree (for example, an intermediate value between a maximum opening degree and a minimum opening degree). The operation for completing operation of the compressor 735 is an operation for completing rotation of the pressing member 735d by stopping supply of electric power to the compressor motor by the controller.

Meanwhile, the second control procedure S60 executed when the temperature measured in the temperature measurement procedure S20 is lower than the reference temperature may include an operation S61 for varying the control command set in the course setting procedure S10 (data for RPM control of the impeller 751, data for RPM control of the compressor 735 or data for opening degree control of the expansion valve 737), and an operation for controlling the impeller 751, the compressor 735, and the expansion valve 737 based on the varied control data.

The operation S61 for changing the control command set in the course setting procedure S10 may include an operation for varying at least one of the data for RPM control of the impeller 751, the data for RPM control of the compressor 735 or the data for opening degree control of the expansion valve 737 set in the course setting procedure S10 to a maximum value thereof. That is, the operation S61 for varying the control command may include an operation for varying one or more of the data for RPM control of the impeller 751, the data for RPM control of the compressor 735 and the data for opening degree control of the expansion valve 737 set in the course setting procedure S10 to maximum values thereof, respectively. Alternatively, the operation S61 may include an operation for varying all the data for RPM control of the impeller 751, the data for RPM control of the compressor 735 and the data for opening degree control of the expansion valve 737 set in the course setting procedure 510 to maximum values thereof, respectively.

As the impeller 751, the compressor 735 and the expansion valve 737 are controlled based on the data for RPM control of the impeller 751, the data for RPM control of the compressor 735 and the data for opening degree control of the expansion valve 737 varied to maximum values thereof, in spite of the control data input by the user in the course setting procedure 510, output of the heat pump and output of the fan may be maximized. Accordingly, it may be possible to minimize degradation of drying performance (increase in drying time and decrease in dryness) even when the temperature of the space where the laundry treatment apparatus is installed is low.

While the impeller 751, the compressor 735 and the expansion valve 737 are controlled based on the varied control data, in the second control procedure S60, a dryness measurement operation (primary dryness measurement operation) is executed to measure the dryness of laundry. When the dryness measured in the primary dryness measurement operation is equal to or higher than the first reference dryness (S62), an operation S63 for setting the reference time to increase in proportion to the amount of laundry is executed.

As described above, the reference time setting operation S63 is an operation for determining the time when operation of the heat pump is completed. In the reference time setting procedure S63, the controller may set the reference time to increase in proportion to the time taken until the dryness of laundry measured by the dryness sensing unit 8 reaches the first reference dryness.

Meanwhile, the second control procedure S60 includes a dryness measurement operation (secondary dryness measurement operation) for measuring the dryness of laundry before the reference time elapses, and an operation S64 for determining whether or not the dryness measure in the secondary dryness measurement operation is equal to or higher than a predetermined second reference dryness.

The second reference dryness is set to be higher than the first reference dryness. When the dryness measured before the reference time elapses is equal to or higher than the second reference dryness, the control method according to the embodiment of the present invention proceeds to a procedure S70 for completing operation of the heat pump.

On the other hand, when the dryness measured before the reference time elapses is lower than the second reference dryness, the second control procedure S60 in the control method according to the embodiment of the present invention proceeds to an operation S65 for determining whether or not the reference time has elapsed.

When it is determined that the dryness measured before the reference time elapses is lower than the second reference dryness, and the reference time has elapsed, the second control procedure S60 proceeds to a reference time re-setting operation S67 for setting an additional time for increase of the reference time.

Thereafter, the second control procedure S60 proceeds to an operation S64 for determining whether or not the dryness of laundry measured before the additional time elapses is equal to or higher than the second reference dryness. When the dryness of laundry measured before the additional time elapses is equal to or higher than the second reference dryness, the procedure S70 for completing operation of the heat pump is executed.

Since the above-described second control procedure S60 is a means for solving a problem of an increase in drying time or a situation wherein the dryness of laundry cannot reach a target dryness, the temperature measurement procedure S20 and the second control procedure S60 may be begun immediately after start of the hot air supply procedure including the operations S11, S13 and S15.

That is, the temperature measurement procedure S20 may be begun simultaneously with start of the hot air supply procedure or within one or two minutes after start of the hot air supply procedure. The second control procedure S60 may be begun immediately after completion of the temperature measurement procedure S20 and the temperature comparison procedure S30.

In the control method according to the illustrated embodiment of the present invention, operation of the fan is not completed in the procedure S70 for completing operation of the heat pump. Accordingly, when the procedure S70 for completing operation of the heat pump is continued for a predetermined time, it may be possible to more rapidly lower the temperature of laundry through the procedure S70 for completing operation of the heat pump.

After completion of the procedure S70 for completing operation of the heat pump, the control method according to the embodiment of the present invention proceeds to a procedure S80 for completing operation of the fan and a procedure S90 for completing rotation of the drum.

As apparent from the above description, the control method of the laundry treatment apparatus may provide an effect of controlling an output of a heat pump and an output of a fan based on the temperature of a space where the laundry treatment apparatus is installed.

In addition, the control method of the laundry treatment apparatus may provide an effect of raising an output of a heat pump or an output of a fan, irrespective of a control command selected by the user, when the temperature of a space where the laundry treatment apparatus is installed is low, thereby minimizing degradation of performance occurring under low-temperature conditions.

Accordingly, the present invention is directed to a control method of a laundry treatment apparatus that substantially obviates one or more problems due to limitations and disadvantages of the related art.

An object of the present invention is to provide a control method of a laundry treatment apparatus capable of controlling an output of a heat pump and an output of a fan based on the temperature of a space where the laundry treatment apparatus is installed.

Another object of the present invention is to provide a control method of a laundry treatment apparatus capable of raising an output of a heat pump or an output of a fan, irrespective of a control command selected by the user, when the temperature of a space where the laundry treatment apparatus is installed is low, thereby minimizing degradation of performance occurring under low-temperature conditions.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of a laundry treatment apparatus including a drum configured to provide a space for storing laundry, a duct installed at an outside of the drum and configured to guide air exhausted from the drum to the drum, an impeller disposed in the duct and configured to circulate air, a refrigerant tube configured to form a circulation path of refrigerant, an evaporator disposed in the duct and configured to allow heat exchange between the refrigerant and air introduced into the duct so as to evaporate the refrigerant, a condenser disposed in the duct and configured to allow heat exchange between the refrigerant and air passing around the evaporator so as to condense the refrigerant, a compressor configured to compress the refrigerant emerging from the evaporator and to supply the compressed refrigerant to the condenser, an expansion valve configured to adjust a pressure of the refrigerant transferred from the condenser to the evaporator through control of an opening degree of the refrigerant tube, and a temperature sensing unit configured to measure a temperature of the air exhausted from the drum, includes a course setting procedure for receiving, as an input, a control command including at least one of data for RPM control of the impeller, data for RPM control of the compressor or data for opening degree control of the expansion valve, a hot air supply procedure including an operation for supplying heated air to the drum through control of the impeller, the compressor and the expansion valve, a temperature measurement procedure for measuring a temperature of the air introduced into the duct during execution of the hot air supply procedure by the temperature sensing unit, a first control procedure for controlling the impeller, the compressor and the expansion valve in accordance with the control command set in the course setting procedure when the temperature measured by the temperature sensing unit is equal to or higher than a predetermined reference temperature, and a second control procedure for controlling the impeller, the compressor and the expansion valve in accordance with a control command different from the control command set in the course setting procedure when the temperature measured by the temperature sensing unit is lower than the predetermined reference temperature.

The second control procedure may include an operation for varying one of the data for RPM control of the impeller, the data for RPM control of the compressor or the data for opening degree control of the expansion valve set in the course setting procedure to a maximum value thereof, and an operation for controlling the impeller, the compressor and the expansion valve in accordance with the varied data.

The second control procedure may include an operation for varying all the data for RPM control of the impeller, the data for RPM control of the compressor and the data for opening degree control of the expansion valve set in the course setting procedure to maximum values thereof, respectively, and an operation for controlling the impeller, the compressor and the expansion valve in accordance with the varied data.

The second control procedure may include a primary dryness measurement operation for measuring a dryness of the laundry, an operation for setting a reference time to increase in proportion to a time taken until the dryness measured in the primary dryness measurement operation reaches a predetermined first reference dryness when the measured dryness is equal to or higher than the predetermined first reference dryness, a secondary dryness measurement operation for measuring a dryness of the laundry before the reference time elapses, and an operation for completing operation of the compressor when the dryness measured in the secondary dryness measurement operation before the reference time elapses is equal to or higher than a predetermined second reference dryness.

The second control procedure may further include a reference time re-setting operation for setting an additional time for increase of the reference time when the dryness measured in the secondary dryness measurement operation before the reference time elapses does not reach the second reference dryness, and an operation for completing operation of the compressor when the dryness of the laundry measured before the additional time elapses is equal to or higher than the second reference dryness.

The first control procedure may include a dryness measurement operation for measuring a dryness of the laundry, an operation for setting a reference time to increase in proportion to a time taken until the dryness measured in the dryness measurement operation reaches the first reference dryness when the measured dryness is equal to or higher than the first reference dryness, and an operation for completing operation of the compressor when the reference time elapses.

The temperature measurement procedure may be begun within one or two minutes after start of the hot air supply procedure.

The hot air supply procedure may further include an operation for rotating the drum. Each of the dryness measurement operation, the primary dryness measurement operation and the secondary dryness measurement operation may include an operation for determining the measured dryness to reach the reference dryness set in the associated dryness measurement operation when a value of a voltage enabling flow of current when two different electrodes provided at the laundry treatment apparatus and spaced apart from each other are connected by the laundry is equal to or higher than a predetermined reference value.

The hot air supply procedure may further include an operation for rotating the drum. Each of the dryness measurement operation, the primary dryness measurement operation and the secondary dryness measurement operation may include an operation for determining the measured dryness to reach the reference dryness set in the associated dryness measurement operation when a value of current output when two different electrodes provided at the laundry treatment apparatus and spaced apart from each other are connected by the laundry is equal to or lower than a predetermined reference value.

It is to be understood that both the foregoing general description and the following detailed description of the present invention are exemplary and explanatory and are intended to provide further explanation of the invention as claimed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control method of a laundry treatment apparatus that includes a drum, a duct at an outside of the drum and configured to guide air exhausted from the drum, an impeller disposed in the duct and configured to circulate air, a refrigerant tube configured to form a circulation path of refrigerant, an evaporator disposed in the duct and configured to allow heat exchange between the refrigerant and air introduced into the duct so as to evaporate the refrigerant, a condenser disposed in the duct and configured to allow heat exchange between the refrigerant and air passing around the evaporator so as to condense the refrigerant, a compressor configured to compress the refrigerant from the evaporator and to supply the compressed refrigerant to the condenser, an expansion valve configured to adjust a pressure of the refrigerant transferred from the condenser to the evaporator based on control of an opening degree of the refrigerant tube, and a temperature sensor configured to sense a temperature of the air from the drum, comprising:

a course setting procedure for receiving a control command that includes at least one of data for control of RPM of the impeller, data for control of RPM of the compressor, and data for control of opening degree of the expansion valve;

a hot air supply procedure including an operation for supplying heated air to the drum based on control of the impeller, the compressor and the expansion valve;

a temperature measurement procedure for sensing, by the temperature sensor, a temperature of the air in the duct during the hot air supply procedure;

a first control procedure for controlling the impeller, the compressor and the expansion valve based on the control command when the temperature sensed by the temperature sensor is equal to or higher than a predetermined reference temperature; and a second control procedure for controlling the impeller, the compressor and the expansion valve based on a control command different from the control command in the course setting procedure when the temperature sensed by the temperature sensor is less than the predetermined reference temperature, wherein the second control procedure includes:
an operation for varying, to maximum values, all the data for control of RPM of the impeller, the data for control of RPM of the compressor and the data for control of opening degree of the expansion valve, respectively;
an operation for controlling the impeller, the compressor and the expansion valve based on the varied data;
a primary dryness measurement operation for determining a first dryness of laundry;
an operation for setting a reference time based on a time taken until the determined first dryness reaches a predetermined first reference dryness when the determined first dryness is equal to or higher than the predetermined first reference dryness;
a secondary dryness measurement operation for determining a second dryness of the laundry before the reference time elapses; and
an operation for completing operation of the compressor when the determined second dryness before the reference time elapses is equal to or higher than a predetermined second reference dryness.

2. The control method according to claim 1, wherein the second control procedure includes:
a reference time re-setting operation for setting an additional time for increase of the reference time when the determined second dryness before the reference time elapses does not reach the second reference dryness; and
an operation for completing operation of the compressor when the determined second dryness of the laundry before the additional time elapses is equal to or higher than the second reference dryness.

3. The control method according to claim 1, wherein the first control procedure includes:
a dryness measurement operation for determining a third dryness of the laundry;
an operation for setting a reference time to increase based on a time taken until the determined third dryness reaches the first reference dryness when the determined third dryness is equal to or higher than the first reference dryness; and
an operation for completing operation of the compressor when the reference time elapses.

4. The control method according to claim 3, wherein the temperature measurement procedure begins within 1-2 minutes after start of the hot air supply procedure.

5. The control method according to claim 4, wherein:
the hot air supply procedure includes an operation for rotating the drum; and
each of the dryness measurement operation, the primary dryness measurement operation and the secondary dryness measurement operation includes an operation for determining the dryness to reach the reference dryness set in the associated dryness measurement operation when a value of a voltage enabling flow of current is equal to or higher than a predetermined reference value.

6. The control method according to claim 4, wherein:
the hot air supply procedure includes an operation for rotating the drum; and
each of the dryness measurement operation, the primary dryness measurement operation and the secondary dryness measurement operation includes an operation for determining the dryness to reach the reference dryness set in the associated dryness measurement operation when a value of current output is equal to or lower than a predetermined reference value.

7. A control method of a laundry treatment apparatus that includes a drum, a duct at an outside of the drum and configured to guide air exhausted from the drum, an impeller disposed in the duct and configured to circulate air, a refrigerant tube, an evaporator disposed in the duct and configured to allow heat exchange between refrigerant and air introduced into the duct, a condenser disposed in the duct and configured to allow heat exchange between the refrigerant and air passing around the evaporator, a compressor configured to compress the refrigerant from the evaporator and to supply the compressed refrigerant to the condenser, an expansion valve configured to adjust a pressure of the refrigerant from the condenser to the evaporator based on an opening of the refrigerant tube, and a temperature sensor configured to sense a temperature of the air from the drum, comprising:
receiving a first control command that includes at least one of control data for RPM of the impeller, control data for RPM of the compressor, and control data for opening of the expansion valve;
supplying heated air to the drum based on control of the impeller, the compressor and the expansion valve;
sensing, by the temperature sensor, a temperature of the air in the duct during the supplying of heated air to the drum;
first controlling of the impeller, the compressor and the expansion valve based on the control command when the temperature sensed by the temperature sensor is equal to or higher than a predetermined reference temperature; and
second controlling of the impeller, the compressor and the expansion valve based on a second control command different from the first control command when the temperature sensed by the temperature sensor is less than the predetermined reference temperature,
wherein the second controlling includes:
varying, to maximum values, all the control data for RPM of the impeller, the control data for RPM of the compressor and the control data for opening of the expansion valve, respectively;
controlling the impeller, the compressor and the expansion valve based on the varied control data;
determining a first dryness of laundry;
setting a reference time based on a time taken until the determined first dryness reaches a predetermined first reference dryness when the determined first dryness is equal to or higher than the predetermined first reference dryness;
determining a second dryness of the laundry before the reference time elapses; and
completing operation of the compressor when the determined second dryness before the reference time elapses is equal to or higher than a predetermined second reference dryness.

8. The control method according to claim 7, wherein the second controlling includes:
setting an additional time for increase of the reference time when the determined second dryness before the reference time elapses does not reach the second reference dryness; and
completing operation of the compressor when the determined second dryness of the laundry before the additional time elapses is equal to or higher than the second reference dryness.

9. The control method according to claim 7, wherein the first controlling includes:
- determining a third dryness of the laundry;
- setting a reference time to increase based on a time taken until the determined third dryness reaches the first reference dryness when the determined third dryness is equal to or higher than the first reference dryness; and
- completing operation of the compressor when the reference time elapses.

10. A control method of a laundry treatment apparatus that includes a drum, a duct configured to guide air from the drum, an impeller disposed in the duct, a refrigerant tube, an evaporator disposed in the duct, a condenser disposed in the duct, a compressor, an expansion valve configured to adjust a pressure of the based on an opening of the refrigerant tube, and a temperature sensor configured to sense a temperature of the air from the drum, comprising:
- receiving a first control command that includes at least one of control data for the impeller, control data for the compressor, and control data for opening of the expansion valve;
- supplying heated air to the drum based on control of the impeller, the compressor and the expansion valve;
- sensing, by the temperature sensor, a temperature of the air in the duct during the supplying of heated air to the drum;
- first controlling of the impeller, the compressor and the expansion valve based on the first control command when the temperature sensed by the temperature sensor is equal to or higher than a predetermined reference temperature; and
- second controlling of the impeller, the compressor and the expansion valve based on a second control command when the temperature sensed by the temperature sensor is less than the predetermined reference temperature, wherein the second controlling includes:
- varying all the control data for the impeller, the control data for the compressor and the control data for opening of the expansion valve;
- controlling the impeller, the compressor and the expansion valve based on the varied control data;
- determining a first dryness of laundry;
- setting a reference time based on a time taken until the determined first dryness reaches a predetermined first reference dryness when the determined first dryness is equal to or higher than the predetermined first reference dryness;
- determining a second dryness of the laundry before the reference time elapses; and
- completing operation of the compressor when the determined second dryness before the reference time elapses is equal to or higher than a predetermined second reference dryness.

11. The control method according to claim 10, wherein the second controlling includes:
- setting an additional time for increase of the reference time when the determined second dryness before the reference time elapses does not reach the second reference dryness; and
- completing operation of the compressor when the determined second dryness of the laundry before the additional time elapses is equal to or higher than the second reference dryness.

* * * * *